US007606999B2

(12) United States Patent
Agarwala

(10) Patent No.: US 7,606,999 B2
(45) Date of Patent: Oct. 20, 2009

(54) MERGING BRANCH INFORMATION WITH SYNC POINTS

(75) Inventor: Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 290 days.

(21) Appl. No.: 11/383,678

(22) Filed: May 16, 2006

(65) Prior Publication Data

US 2007/0271448 A1    Nov. 22, 2007

(51) Int. Cl.
  *G06F 9/44*   (2006.01)
(52) U.S. Cl. .......................... 712/227; 714/45; 717/128
(58) Field of Classification Search .................. 712/227; 714/45; 717/128
  See application file for complete search history.

(56) References Cited

U.S. PATENT DOCUMENTS

| | | | | |
|---|---|---|---|---|
| 5,659,679 A * | 8/1997 | Alpert et al. | | 714/34 |
| 5,809,293 A * | 9/1998 | Bridges et al. | | 712/227 |
| 5,996,092 A * | 11/1999 | Augsburg et al. | | 714/38 |
| 6,009,270 A * | 12/1999 | Mann | | 717/128 |
| 6,173,395 B1 * | 1/2001 | Wisor et al. | | 712/236 |
| 6,647,545 B1 * | 11/2003 | Kurts et al. | | 717/128 |
| 2002/0055830 A1 * | 5/2002 | Swoboda et al. | | 703/19 |
| 2003/0051122 A1 * | 3/2003 | Sato | | 712/227 |
| 2003/0192034 A1 * | 10/2003 | Hayase | | 717/128 |
| 2004/0078690 A1 * | 4/2004 | Kohashi | | 714/38 |
| 2004/0102951 A1 | 5/2004 | Agarwala et al. | | |
| 2004/0153808 A1 | 8/2004 | Agarwala et al. | | |
| 2004/0153812 A1 * | 8/2004 | Miyayama et al. | | 714/36 |

OTHER PUBLICATIONS

"Modern Processor Design," Shen, Lipasti, McGraw-Hill Professional, 2004, p. 223.*

* cited by examiner

*Primary Examiner*—Eddie P Chan
*Assistant Examiner*—Keith Vicary
(74) *Attorney, Agent, or Firm*—Mirna G. Abyad; Wade J. Brady, III; Frederick J. Telecky, Jr

(57) ABSTRACT

A method for merging branch information with sync points is disclosed herein. The method comprises determining whether a sync point is to be generated concurrent with a branch instruction and generating said sync point to include a program counter value and to indicate that the sync point occurred concurrent with the branch instruction.

12 Claims, 2 Drawing Sheets

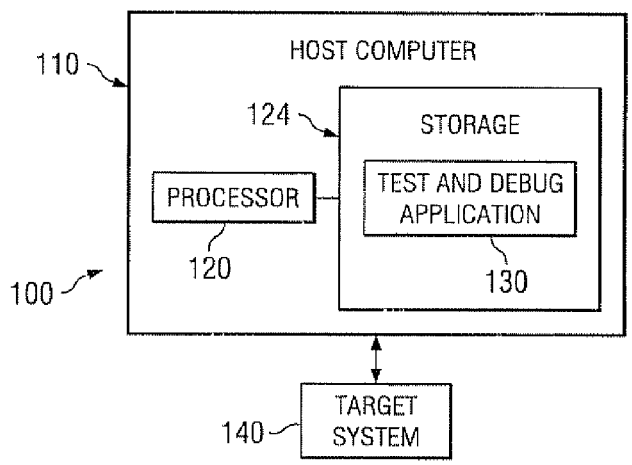
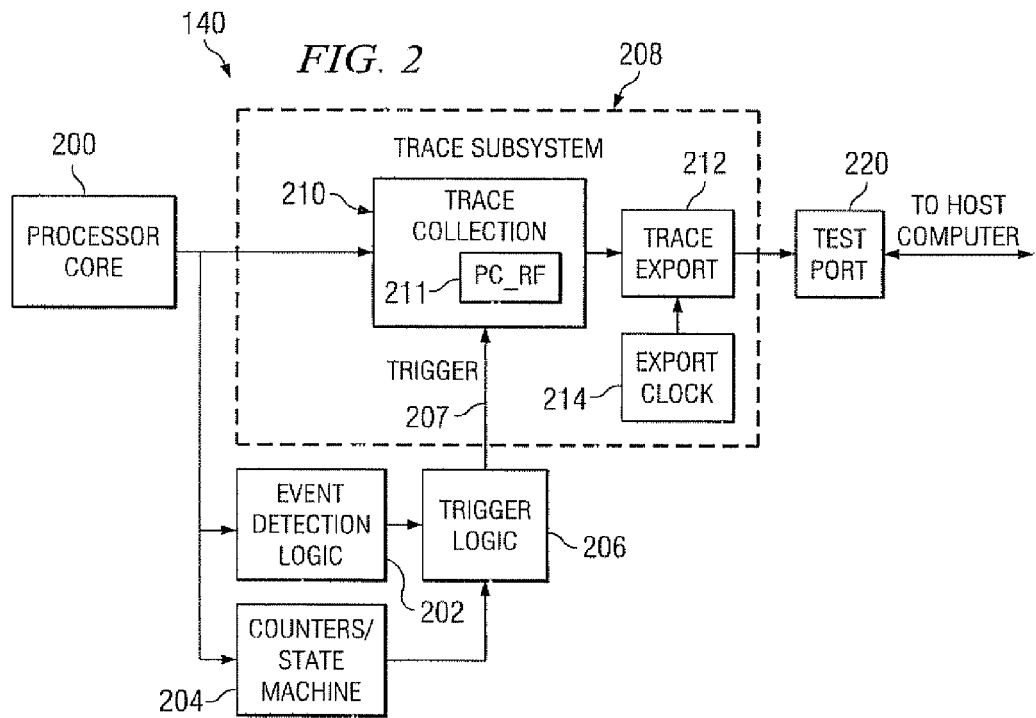

MERGING BRANCH INFORMATION WITH SYNC POINTS

BACKGROUND

Integrated circuits are ubiquitous in society and can be found in a wide array of electronic products. Regardless of the type of electronic product, most consumers have come to expect greater functionality when each successive generation of electronic products are made available because successive generations of integrated circuits offer greater functionality such as faster memory or microprocessor speed. Moreover, successive generations of integrated circuits that are capable of offering greater functionality are often available relatively quickly. For example, Moore's law, which is based on empirical observations, predicts that the speed of these integrated circuits doubles every eighteen months. As a result, integrated circuits with faster microprocessors and memory are often available for use in the latest electronic products every eighteen months.

Although successive generations of integrated circuits with greater functionality and features may be available every eighteen months, this does not mean that they can then be quickly incorporated into the latest electronic products. In fact, one major hurdle in bringing electronic products to market is ensuring that the integrated circuits and software running thereon, with their increased features and functionality, perform as desired. Generally speaking, ensuring that the integrated circuits will perform their intended functions when incorporated into an electronic product is called "debugging" the electronic product.

Many integrated circuits to be tested include internal logic to provide visibility to the internal workings of the integrated circuit to an external host computer. Unfortunately, such testing-related logic on the integrated circuit takes up valuable space and consumes power.

SUMMARY

In accordance with various embodiments of the invention, a target address of a branch instruction is communicated to a host system in such a way as to preferably avoid the use of a register file on a target system otherwise dedicated for use by branch instructions. By not including a register file dedicated for exclusive use to communicate target addresses of branch instructions, power and space are saved.

In accordance with at least one embodiment, a method comprises determining whether a sync point is to be generated concurrent with a branch instruction and generating the sync point to include a program counter value and to indicate that the sync point occurred concurrent with the branch instruction.

In accordance with yet another embodiment, a method comprises encountering a branch instruction during execution of a program and populating a program counter register file with a target address of the branch instruction. The method further comprises encoding a bit in the program counter register file to indicate that the target address in the program counter register file is a target address of the branch instruction.

In accordance with yet another embodiment, a system comprises a central processing unit (CPU) core and a trace subsystem coupled to the CPU core. The trace subsystem determines when a sync point is to be generated concurrent with a branch instruction and generates the sync point to include a program counter value and to indicate that the sync point occurred concurrent with the branch instruction.

In accordance with yet another embodiment, a storage medium contains software that, when executed by a processor, causes the processor to perform various actions. Such actions comprise, for example, receiving a sync point from a target system. The sync point contains a program counter value and a bit that indicates whether the program counter value pertains to a target address of a branch instruction. The actions also comprise decoding the sync point to retrieve the program counter value and to determine whether the program counter value pertains to the target address of the branch instruction.

BRIEF DESCRIPTION OF THE DRAWINGS

For a detailed description of exemplary embodiments of the invention, reference will now be made to the accompanying drawings in which:

FIG. 1 depicts an exemplary debug and test system in accordance with a preferred embodiment of the invention;

FIG. 2 depicts an embodiment of a target system usable with the debug and test system of FIG. 1.

DETAILED DESCRIPTION

Figure 3:
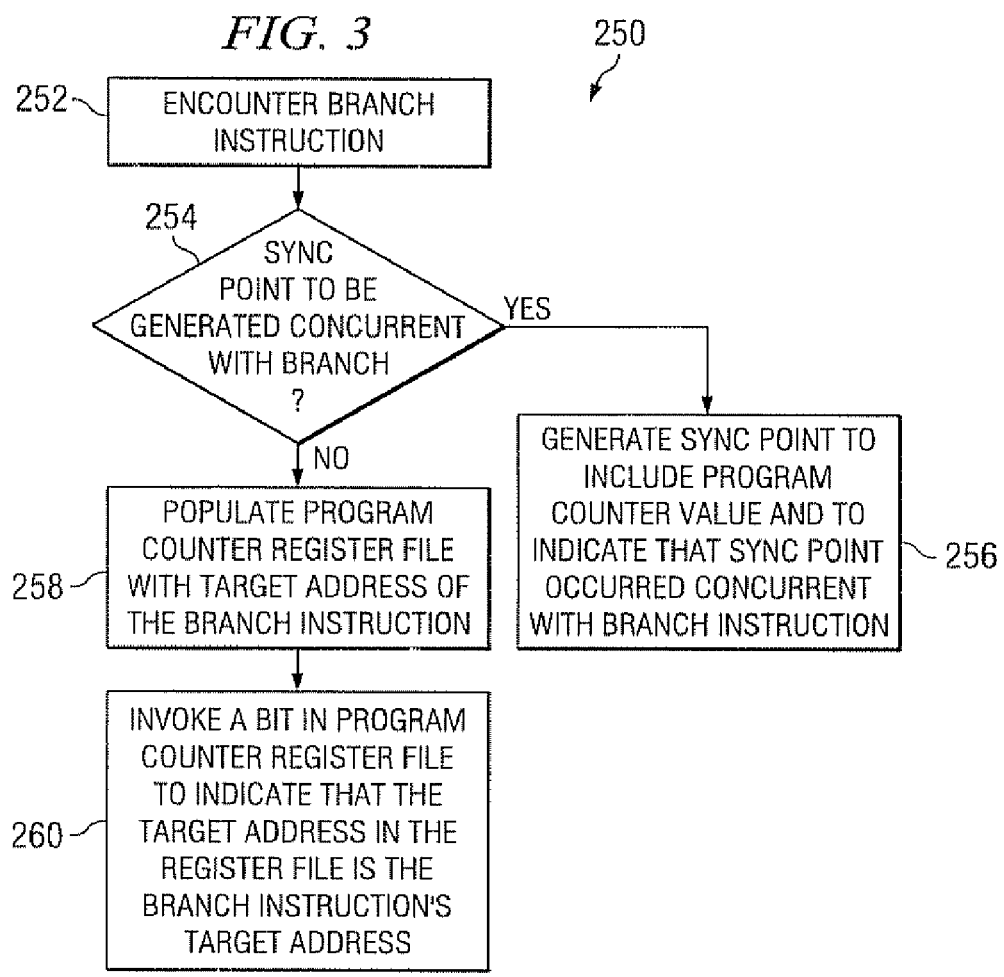
FIG. 3 shows an exemplary method for providing branch target address information in accordance with embodiments of the invention.

FIG. 1 shows a test system 100 by which a host computer 110 couples to a target system 140. The host computer 110 comprises at least a processor 120 coupled to a storage medium 124. Storage medium 124 may comprise volatile memory such as random access memory (RAM), non-volatile storage such as read only memory (ROM), a hard disk drive, or a CD ROM, or combinations thereof. The storage medium 124 may be internal to the host computer 110 or external to the host computer. The storage medium 124 contains software shown as a test and debug application 130 that is executable by processor 120 to perform one or more of the actions described herein.

The target system 140 comprises an electrical device or system that is to be tested by the application 130 running on the host computer 110. The target system 140 may comprise an integrated circuit (IC), a plurality of ICs coupled together, a circuit board, etc. The target system 140 itself may have a processor that executes software. Under control of the test and debug application 130, the host computer 110 receives information from the target system 140. Such information pertains to the operation of the target system such as the operation of any software running on the target system 140. Such information is usable by a user of the host computer 110 to verify operation of the target system and to diagnose any problems that may occur on the target system.

FIG. 2 shows an exemplary block diagram of the target system 140. As shown, the target system 140 comprises a processor core 200 coupled to event detection logic 202, counters/state machine 204, and a trace subsystem 208. The target system also comprises trigger logic 206 which receives signals from the event detection logic 202 and counters/state machine 204 and provides trigger signals 207 to trace collection logic 210 that forms at least part of the trace subsystem 208. The trace subsystem 208 also comprises trace export logic 212 and an export clock 214. The trace export logic 212 couples to a test port 220 which, in turn, couples to the host computer 110.

The trace subsystem 208 receives various types of information that may be of interest to a user of host computer 110 to debug and test the operation of the target system. Such information may include program counters, timing data, memory read and write access addresses and corresponding data, data handled by application programs, etc. Events pertaining to such information are determined by the processor core 200, event detection logic 202 and counters/state machine 204, and other logic as desired. The trigger logic 206 provides trigger signals 207 to the trace collection logic 210 to cause the trace collection logic to record an applicable piece of information. The collected information generally comprises three types of trace information—timing trace information, program counter trace information, and data trace information. These three types of trace information are further described in, for example, U.S. Pat. Pub. No. 2004/0153808, published Aug. 5, 2004 and incorporated herein by reference.

The trace collection logic 210 also merges together the information from the timing, program counter and data traces and provides the merged trace information to the trace export logic 212. The trace export logic 212, under timing control of export clock 214, provides the merged trace information to the test port 220 for subsequent delivery to the host computer 110.

Each trace stream includes one or more markers called "synchronization points," or "sync points." Thus, the timing stream includes timing stream sync points, the program counter stream includes program counter sync points and the data stream may also include sync points. In at least some embodiments, a sync point comprises a packet of information that is transmitted by the target system 140 to the host computer 110. The sync points include identifiers. By using the same identifiers in the timing, program counter, and data sync points that are generated at the same time, the host computer 110 can synchronize the information provided to the host computer while decoding the trace stream from the target system. U.S. Pat. Pub. No. 2004/0153808, referenced above, may provide additional information about sync points and their usage.

Some sync points are generated at predetermined events, such as the start of a trace and at the end of a trace. Other sync points are generated at periodic intervals. Program counter sync points comprise the program counter value at the time the sync point is generated.

As used herein, a branch instruction is an instruction for which the target address of the branch is provided in, or otherwise pointed by the instruction. Such branch instructions are, or at least include, registered branch instructions in which the branch instruction includes an identity of a register and the identified register includes the target address of the branch. In some embodiments, the target address comprises a 32-bit address although the size of the target address is generally irrelevant to this disclosure. Target addresses of branch instructions may be information that would be useful to a user of the host computer 110 while testing and debugging the target system 140. In accordance with preferred embodiments of the invention, branch instructions' target addresses are provided to the host computer 110 without using a register that might otherwise be dedicated for exclusive use for just this purpose. Because a branch instruction target address register file is not necessary, such a register file is not provided in a preferred embodiment of the target system 140, thereby saving space and power.

FIG. 3 illustrates an exemplary method 250 by which the target system 140 can communicate the branch instructions' target addresses to the host computer 110. At 252, the target system's processor core 200 encounters a branch instruction while executing code. At 254, the trace subsystem 208 preferably determines whether a sync point is to be generated concurrent with the encountered branch instruction. Such a sync point may comprise, for example, a periodic program counter sync point that coincidentally happens to be generated in the same cycle at which the branch instruction has been encountered. The branch instruction contains the target address of the branch which is loaded into the program counter to enable the code execution to branch to the target address. A program counter sync point generated upon encountering a branch instruction thus contains the target address of the branch instruction. In such a case, there is no need to separately communicate the target address of the branch instruction—the program counter sync point just so happens to contain the target address. Thus, if the sync point to be generated occurs concurrent with the branch instruction, control passes to action 256 in which the sync point is generated to include the program counter value (which happens to also represent the target address of the branch instruction). Further, the sync point is generated to also indicate that the sync point occurred concurrent with the branch instruction. In at least some embodiments, one bit (and in some embodiments multiple bits) in the sync point is encoded to indicate whether or not the program counter value in the sync point represents a branch instruction target address. The host computer's test and debug application 130 receives the sync point, and decodes the previously mentioned bit to determine whether the program counter value in the sync point represents a branch instruction's target address.

Referring still to FIG. 3, if a sync point is not to be generated concurrent with the branch instruction, then another mechanism is used to provide the branch instruction's target address to the host computer 110 without using a branch instruction-dedicated register file. At 258, method 250 comprises the trace subsystem 208 populating a program counter register file (PC_RF) 211 as shown in FIG. 2 with the branch instruction's target address. The PC_RF 211 is used to transmit program counter trace stream information to the host computer 110 and includes sufficient storage to accommodate the branch instruction's target address. In 260, the trace subsystem 208 encodes a bit (or multiple bits) in the PC_RF 211 to indicate that the target address in the PC_RF is the branch instruction's target address, as opposed to a program counter value that represents an address other than the target address. Such a bit(s) is evaluated by the test and debug application 130 running on the host computer 110 to determine whether the program counter value in the PC_RF is, in fact, a branch instruction target address.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A method, comprising:
   determining whether a sync point is to be generated concurrent with an encountering of a branch instruction, wherein the sync point comprises a packet of information that is transmitted by a target system to a host computer and causes the host computer to synchronize trace streams; and
   generating said sync point to include a value stored in a program counter at the time the sync point is generated and to indicate that the sync point occurred concurrent with the encountering of a branch instruction, wherein said generating comprises causing a single bit in the sync point to indicate that said program counter value represents a target address of a branch instruction.

2. The method of claim 1 wherein, if no sync point is to be generated concurrent with the branch instruction, populating a program counter register file with a target address of said branch instruction.

3. The method of claim 2 further comprising encoding a bit in the program counter register file to indicate that said target address in the program counter register file is a target address of a branch instruction.

4. The method of claim 1 further comprising not using a register file exclusive to branch instructions to record a target address of a branch instruction.

5. A method, comprising:
  encountering a first branch instruction during execution of a program;
  populating a program counter register file with a target address of said first branch instruction; and
  encoding a bit in the program counter register file to indicate that said target address in the program counter register file is a target address of a branch instruction;
  generating a sync point to include a value stored in a program counter at the time the sync point is generated and to indicate, using a single bit, that the sync point occurred concurrent with the encountering of a second branch instruction and thus the program counter value represents a target address of a second branch instruction, wherein the sync point comprises a packet of information that is transmitted by a target system to a host computer and causes the host computer to synchronize trace streams.

6. The method of claim 5 further comprising not using a register file that is exclusive to branch instructions to record said target address.

7. A system, comprising:
  a central processing unit (CPU) core; and
  a trace subsystem coupled to said CPU core, said trace subsystem determines when a sync point is to be generated concurrent with an encountering of a branch instruction and generates said sync point to include a value stored in a program counter at the time the sync point is generated and to indicate that the sync point occurred concurrent with the encountering of a branch instruction, wherein the sync point comprises a packet of information that is transmitted by a target system to a host computer and causes the host computer to synchronize trace streams;
  wherein said trace subsystem generates said sync point by causing a single bit in said sync point to indicate that the program counter value in the sync point represents a target address of a branch instruction.

8. The system of claim 7 wherein said trace subsystem comprises a program counter register file and if said trace subsystem determines that no sync point is to be generated concurrent with the branch instruction, said trace subsystem populates said program counter register file with a target address of said branch instruction.

9. The system of claim 8 wherein said trace subsystem encodes a bit in the program counter register file to indicate that said target address in the register file is a target address of a branch instruction.

10. The system of claim 7 wherein said trace subsystem does not use a register file exclusive to branch instructions to record a target address.

11. A storage medium containing software that, when executed by a processor, causes the processor to:
  receive a sync point from a target system, said sync point containing a value stored in a program counter at the time the sync point is generated and a single, first bit that indicates whether the program counter value represents a target address of a branch instruction, wherein the sync point causes the processor to synchronize trace streams; and
  decode said sync point to retrieve said program counter value and to determine whether the program counter value represents the target address.

12. The storage medium of claim 11 wherein said software further causes the processor to receive contents of a program counter register file, said contents containing an address and a second bit that encodes whether said address comprises a target address of a branch instruction.

* * * * *